US008434404B1

(12) United States Patent
Herrera

(10) Patent No.: US 8,434,404 B1
(45) Date of Patent: May 7, 2013

(54) SHEETER WITH SPIRALED STRIPPER WIRE AND CONVEYER BELT WITH LANDING ZONE

(75) Inventor: Michael L. Herrera, Los Alamitos, CA (US)

(73) Assignee: Casa Herrera, Inc., Pomona, CA (US)

( * ) Notice: Subject to any disclaimer, the term of this patent is extended or adjusted under 35 U.S.C. 154(b) by 266 days.

(21) Appl. No.: 12/730,044

(22) Filed: Mar. 23, 2010

Related U.S. Application Data

(60) Provisional application No. 61/162,618, filed on Mar. 23, 2009.

(51) Int. Cl.
*A23L 1/01* (2006.01)
*A21D 6/00* (2006.01)
*A21C 3/02* (2006.01)

(52) U.S. Cl.
USPC ............... 99/330; 99/537; 426/439; 426/502; 425/310

(58) Field of Classification Search .................... 99/330, 99/339, 340, 353–355, 372, 373, 386, 403–407, 99/410, 409, 426, 443 C, 505, 512, 496, 499, 99/537; 426/502, 503, 517, 518, 389; 425/194, 425/215, 217, 298, 310, 363
See application file for complete search history.

(56) References Cited

U.S. PATENT DOCUMENTS

| 4,302,478 | A | * | 11/1981 | Hamann et al. | ............... 426/517 |
|---|---|---|---|---|---|
| 4,348,166 | A | * | 9/1982 | Fowler | ............... 425/310 |
| 5,580,583 | A | * | 12/1996 | Caridis et al. | ............... 425/142 |
| 5,811,137 | A | * | 9/1998 | Clark et al. | ............... 425/194 |
| 5,863,566 | A | * | 1/1999 | Wood et al. | ............... 425/130 |
| 6,159,518 | A | * | 12/2000 | Wilson | ............... 426/502 |
| 6,268,005 | B1 | * | 7/2001 | Brewer | ............... 426/502 |
| 6,361,609 | B1 | * | 3/2002 | Ouellette et al. | ............... 134/1 |
| 6,467,398 | B2 | * | 10/2002 | Fink et al. | ............... 99/330 |

* cited by examiner

*Primary Examiner* — Nini Legesse
(74) *Attorney, Agent, or Firm* — Myers Andras LLP; Joseph C. Andras

(57) ABSTRACT

A sheeter includes an internally grooveless front roller, a rear roller configured to rotate counter to the front roller, a partially spiraled stripper wire coupled across the front roller, and a conveyer belt connected to a proximal conveyer roller and a distal conveyer roller. The conveyer belt includes a landing zone configured to prevent damage to a received product. The conveyer belt includes a raised portion adjacent to the proximal end and flat portion towards the distal end.

21 Claims, 17 Drawing Sheets

SHEETER WITH SPIRALED STRIPPER WIRE AND CONVEYER BELT WITH LANDING ZONE

CROSS-REFERENCE TO RELATED APPLICATIONS

This Non-Provisional application claims priority under 35 U.S.C. §119(e) of U.S. Provisional Application No. 61/162,618 filed on Mar. 23, 2009, the entire contents of which are hereby incorporated by reference.

BACKGROUND

1. Field of the Invention

The present invention relates generally to food production machinery and, more particularly, to an improved sheeter with spiraled stripper wire and conveyer belt with a landing zone.

2. Description of the Related Art

Machines called "sheeters" are routinely used in production lines that produce tortillas and tortilla chips. In general, as shown in FIGS. 1-3 and 4A-4D, a conventional sheeter consists of a pair of closely-spaced counter-rotating rollers 20, 30 that compress a mass of corn masa 11 (or other dough) into a sheet 12 within a gap between the two rollers. As the sheet 12 exits the gap, it is separated from the back roller 20 using a stripper wire stretched across its width or, more commonly of late and as suggested, by rotating the front and back rollers at slightly different speeds. Another approach to encouragins separation is using a coated back roller (e.g. coated with Teflon®) so that it has a lower coefficient of friction than the front roller (e.g. made with UHMW). The sheet 12 remains adhered to the front roller 30 and, at this point, a patterned "cutter roller" 40 forms shaped dough pieces 70 by cutting a pattern into the sheet 12 by rotating its patterned walls against the front roller 30 through the dough sheet 12. After this, a stripper wire 50 stretched across the width of the front roller 30 strips the chip-shaped pieces and surrounding web of "re-works" (if any), after which the shaped dough pieces 70 land on a take-away conveyer belt 60 that moves the dough pieces 70 onward (e.g. into an oven, not shown). The excess dough 13 (called "re-work") surrounding the shaped dough pieces 70 (between rows and/or between sequential ones of the shaped dough pieces, depending on the pattern) is rotated upward on the front-roller 30 to merge with the fresh masa located between the rollers.

In the prior art, typically, the front roller 30 is provided with a plurality of grooves that hold flat bands (e.g. 32) (sometimes collectively hereafter "band grooves"). The bands 32 generally serve two purposes. First, because the front stripper wire 50 is threaded beneath the bands 32, the bands 32 help hold the wire 50 against the roller 30 to strip the shaped product pieces (see pieces 71) off of the front roller 30 and onto the conveyor belt 60. The bands 32 also tend to pinch the re-work 13 that is located between product rows to help make that re-work 13 stay with the front roller 30. As shown, these bands 32 are traditionally located between rows of the chip-shaped pieces to help pull the re-work 13 back onto the front roller 30 and rotate it up and around for recombination with the masa, rather than allowing it to land on the take-away conveyer 60 with the chip-shaped pieces 70. When the bands 32 are used with certain product shapes, real estate on the front roller 30 that could otherwise be used for product rows is wasted. In FIG. 4A, for example, there are only ten rows of triangular shaped dough pieces due to the interior band grooves 32. Since the rows of this particular shape (and others) could be placed side-by-side without any unused dough, it is the band grooves 32 alone that are wasting space.

The prior art stripper wire 50 has traditionally had a slight spiral from one end 51 to another end 52. However, due to drag-related forces, the frictional forces associated with the masa and the front roller 30 tends to pull the wire 50 upward to a central high spot 53.

The industry has previously taken different approaches to try and eliminate all bands, or at least eliminate the intermediate bands 32 (leaving only the left-most and right-most bands 31, 31 to return the outer edges of re-work surrounding the product). The applicant's prior patent application Ser. No. 10/346,362 is an example of one such approach, the entire content of which is hereby incorporated by reference. It features a vibrating T-shaped blades rather than a stripper wire. The invention of Ser. No. 10/346,362 may well prove successful, but stripper wires remain popular such that there remains a need for an improved sheeter that uses a stripper wire without intermediate bands to maximize product efficiency.

BRIEF SUMMARY

One aspect of an embodiment of the invention includes a sheeter including an internally grooveless front roller, a rear roller configured to rotate counter to the front roller, a partially spiraled stripper wire coupled across the front roller, and a conveyer belt connected to a proximal conveyer roller and a distal conveyer roller. The conveyer belt includes a landing zone configured to prevent damage to a received product. The conveyer belt includes a raised portion adjacent to the proximal end and flat portion towards the distal end.

Another aspect of an embodiment of the invention provides a sheeter apparatus including an internally grooveless front roller, a stripper wire coupled across the front roller, a conveyer belt coupled to a proximal conveyer roller and a distal conveyer roller, and an elevation device disposed between the proximal conveyer roller and the distal conveyer roller. The conveyer belt includes a raised portion adjacent to the elevation device. The conveyer belt includes a landing zone configured to prevent damage to a received product.

Yet another aspect of an embodiment of the invention provides a method of manufacturing a plurality of product pieces using a sheeter device. The method includes providing a raw product mass to a cutter configured to shape the raw product into a plurality of product pieces, transferring the plurality of product pieces to a conveyer belt, pressing the plurality of pieces with an internally grooveless front roller, stripping the plurality of product pieces from the front roller, and catching the plurality of product pieces stripped by the front roller onto a landing zone of the conveyer belt. The landing zone spans the width of the conveyer belt and the conveyer belt includes a raised portion and a flat portion. The raised portion of the conveyer belt is configured to prevent damage to the plurality of product pieces.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments for sheeter systems, devices, and methods, as well as operation and/or component parts thereof. While the following description will be described in terms of sheeter devices, systems and methods for clarity and placing the invention in context, it should be kept in mind that the teachings herein may have broad application to all types of systems, devices and applications.

Figure 5:
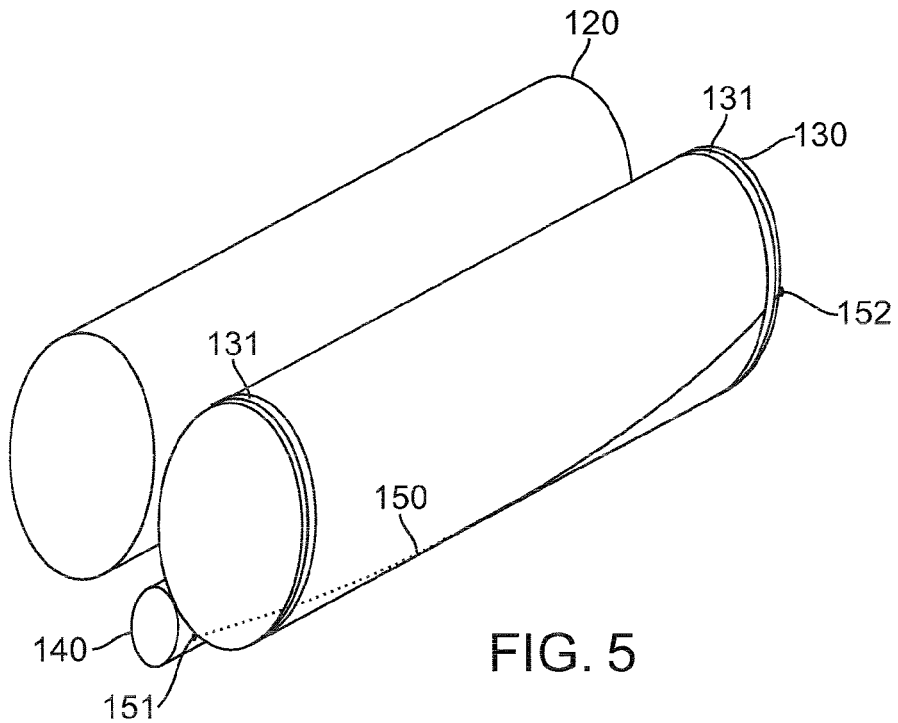
FIG. 5 illustrates a first portion of an improved sheeter according to one embodiment of the invention including a stripper wire with an exaggerated spiral.
Figure 6:
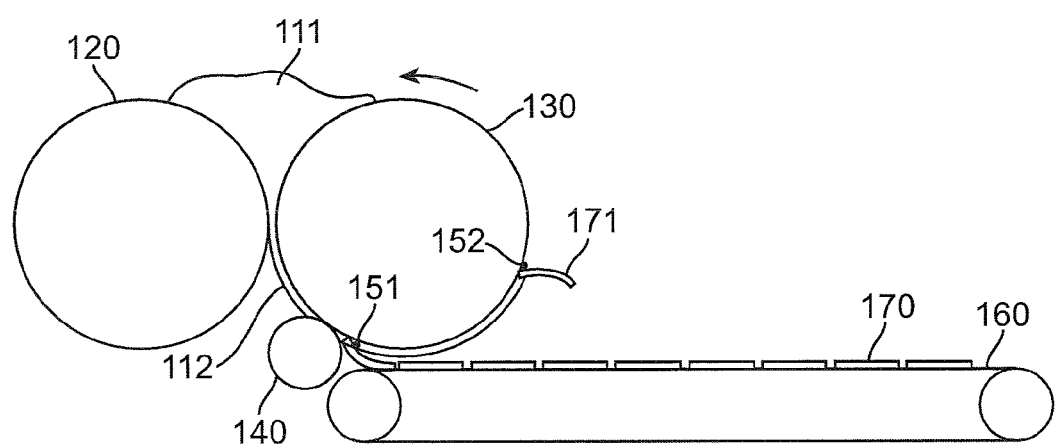
FIG. 6 illustrates a sectional side view of the embodiment illustrated in FIG. 5.

FIG. 5 shows a first portion of an improved sheeter according to one embodiment of the invention. As illustrated, a stripper wire 150 is spiraled across the width of an internally grooveless front roller 130. As shown in FIGS. 5 and 6, best viewed together, the stripper wire 150 runs from one end 151 located at about a "7 PM" position (i.e., if located on a dial of a clock) on the nearest-most end of the roller 130 and spirals to another end 152 located at about "4 PM" (i.e., if located on a dial of a clock) at a farthest-most end of the roller. While not shown, it is well-known in the art to tension the stripper wire 150 by affixing at one end (e.g., far end 152), and by attaching the near end 151 to a tensioning mechanism such as, for example, a guitar peg or a pneumatic cylinder that applies tension to the wire 150. Continuous stripper wire systems with suitable tensioning mechanisms are known as well. The stripper wire may be a discrete segment or a portion of a longer wire used in a continuously or periodically moved wire feed system.

The spiral of FIGS. 5 and 6 is exaggerated relative to ordinary spiral of the prior art. This beneficially allows the wire 150 to stay close to the roller 130 without the need for internal bands and also eliminates the central high spot 53 associated with the prior art arrangement. Now, however, as best shown in FIG. 6, the far end 152 of the wire 150 is quite high above the conveyor belt 160 relative to the rear end 151.

The exaggerated spiral created by the relative high position of the wire's end 152 helps eliminate the need for the intermediate band grooves, but it means that the product 171 being stripped off the front roller in that region has a relatively long distance to travel before it lands on the conveyor belt 160. Thus, if the spiral stripper wire 150 of FIGS. 5 and 6 were simply combined the conventional take-away conveyor used in prior art sheeters, there is an increased probability that the product pieces in that zone would be damaged.

Figure 7:
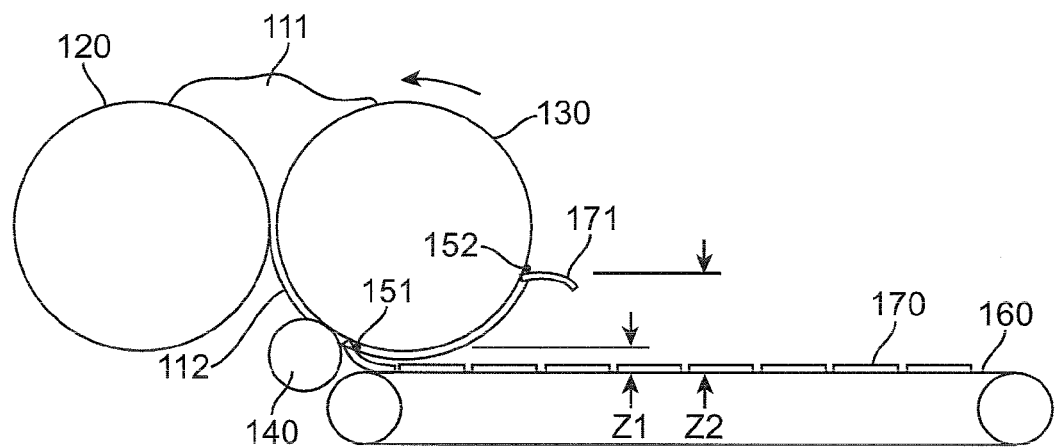
FIG. 7 illustrates the two heights Z1 and Z2 caused by the spiraled stripper wire, the latter tending to cause product defects if used as is with a conventional conveyor belt.

FIG. 7 shows how product near end 151 would fall a relatively small distance Z1, whereas product 171 at the far end would fall a relatively great distance Z2. The product is delicate at this point and the typical result would be damage or defects due to folding, wrinkling, tearing, stacking, flipping, etc.

Figure 8:
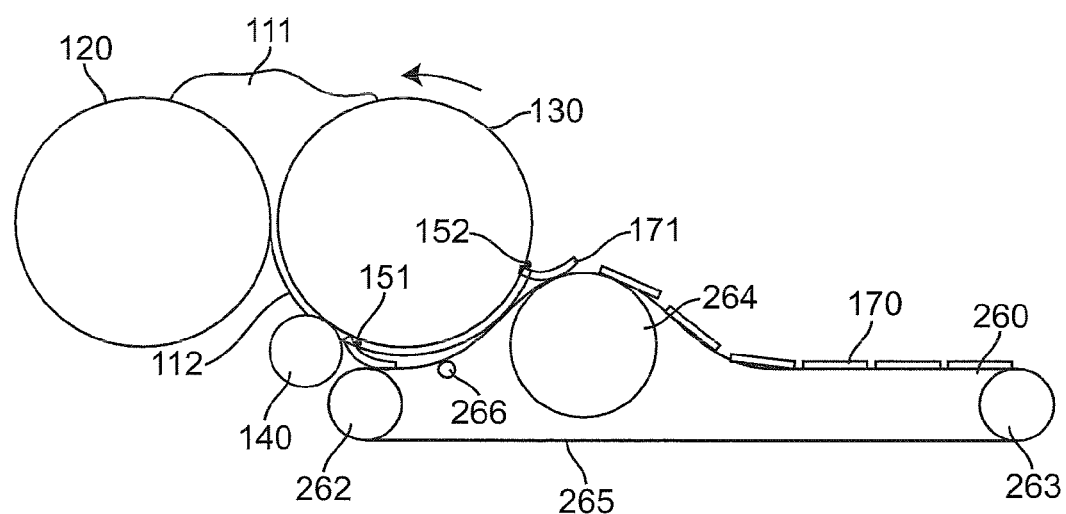
FIG. 8 is a sectional side view of a first preferred embodiment of the invention that includes the spiraled stripper wire of FIGS. 5 and 6 in combination with a conveyor that includes a unique landing zone.

FIG. 8 shows both aspects of the preferred embodiment of the invention. Here, the spiraled stripper wire 150 stretches across the face of an internally grooveless roller 130, in combination with a special conveyor belt 260 that includes an extended landing zone 261 that generally conforms to the curvature of the front roller 130. Through this unique arrangement, the travel distances Z1, Z2 at the near and far ends 151, 152 of the spiraled stripper wire 150 are made to be about the same and are located close enough to the landing zone 261 at all points to minimize product damage.

As further shown in FIG. 8, the presently preferred conveyor 260 comprises a mesh belt 265 that rotates around a pair of end rollers 262, 263. The belt 265, of course, is driven at an appropriate location (not shown). Here, the embodiment further comprises an apex roller 264 that elevates the mesh belt 265 to create the landing zone 261. The landing zone 261 is elevated and, preferably, as shown here, radiused. In other embodiments, the apex roller 264 might be replaced with a curved, but non-rotating surface, i.e. a curved "skid plate" formed from UHMW plastic or similar low-friction material. Other elevation mechanisms are possible.

The preferred embodiment of FIG. 8 also includes a magnetic roller 266 located beneath the mesh belt 265 in the landing zone 261. The magnetic roller 266 generally comprises a stainless steel shaft having a number of tubular magnets in an end to end arrangement. The tubular magnets attract the mesh belt 265 downward. The magnetic roller 266 helps maintain the curvature of the landing zone 261 relative to the roller 130. In some situations, the magnetic roller 266 may be eliminated and in others there may be need or desire for multiple magnetic rollers or other mechanisms (e.g. inwardly extending guide tabs or hold-downs) that help maintain the curvature.

Figure 1:
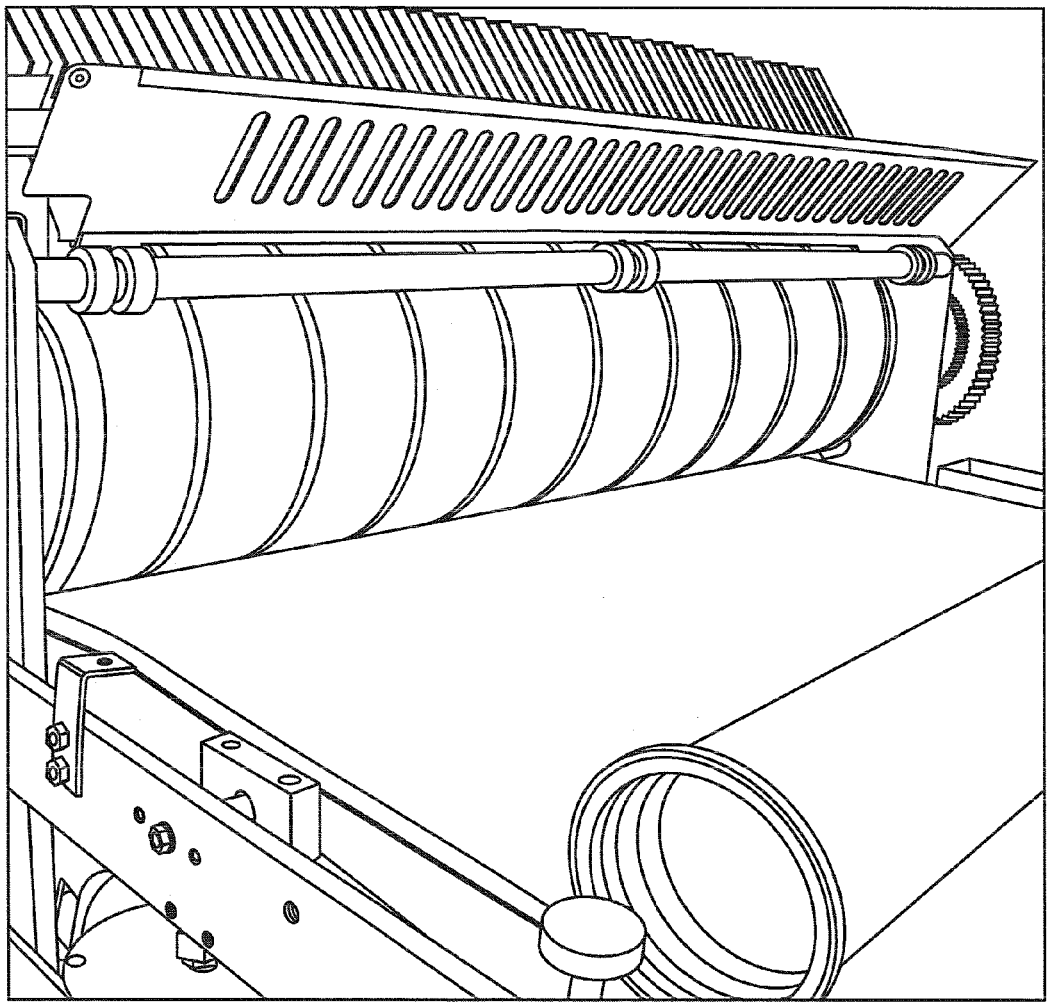
FIG. 1 illustrates a typical prior art sheeter with a front roller that has left and right edge bands and a plurality (9) of intermediate band grooves that consume product space.
Figure 2:
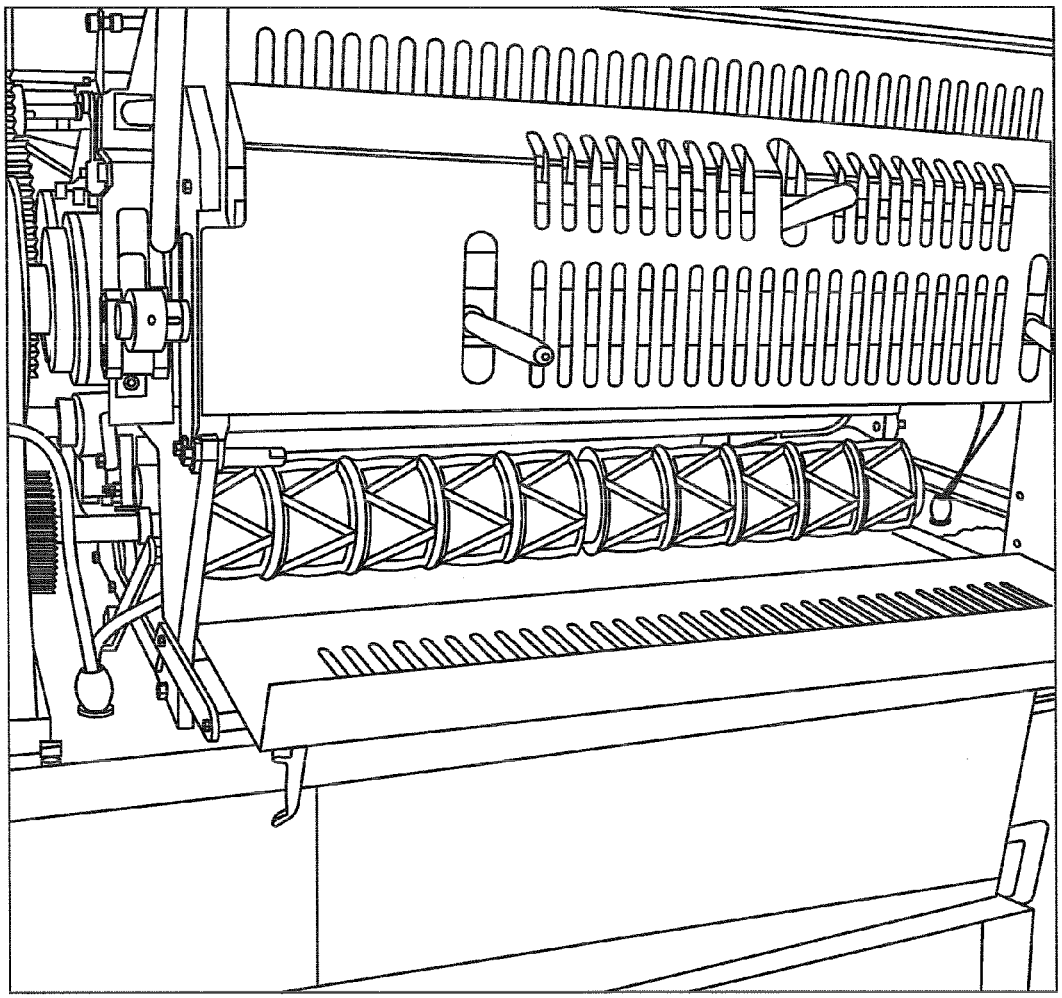
FIGS. 2 and 3 show a back view of the prior art sheeter of FIG. 1 and, more specifically, the cutter roller that includes a plurality of annular gaps that correspond to the band grooves on the front roller.
Figure 3:
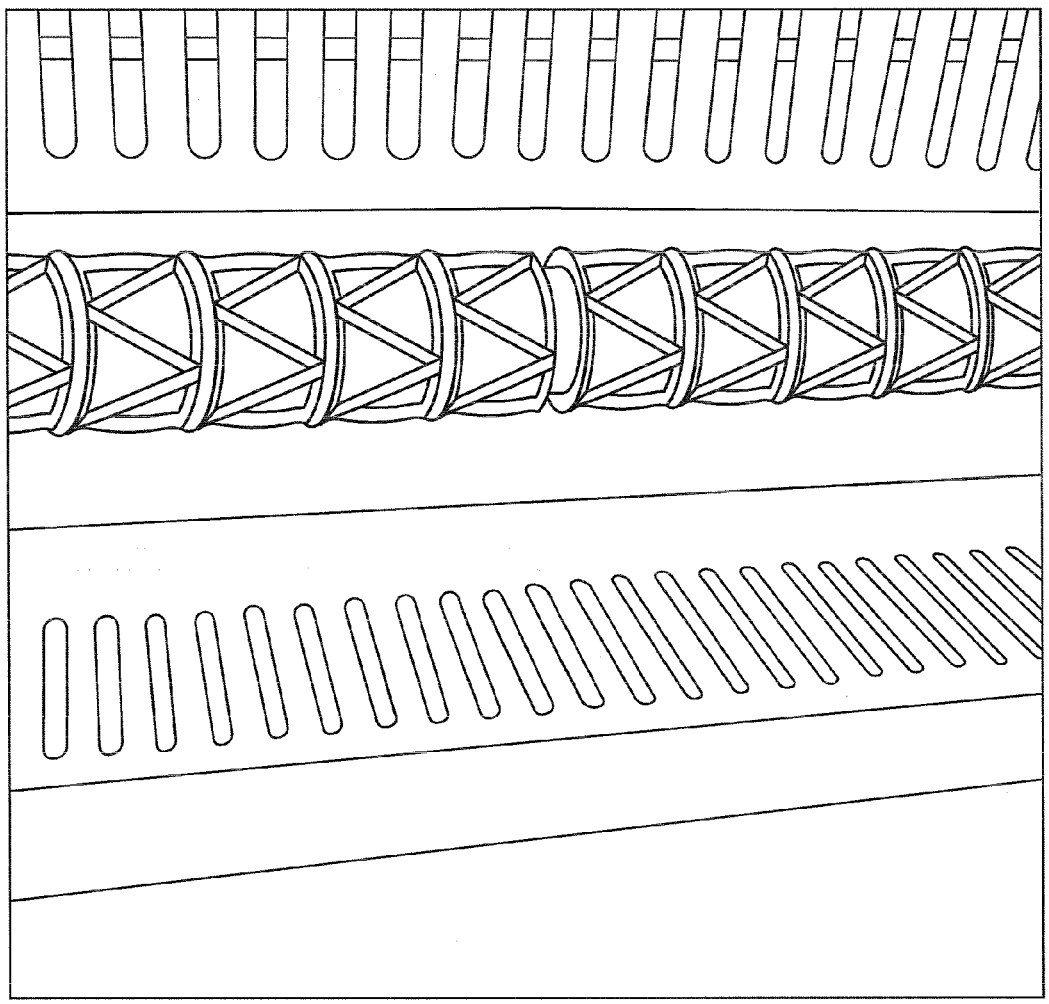
Figure 4A:
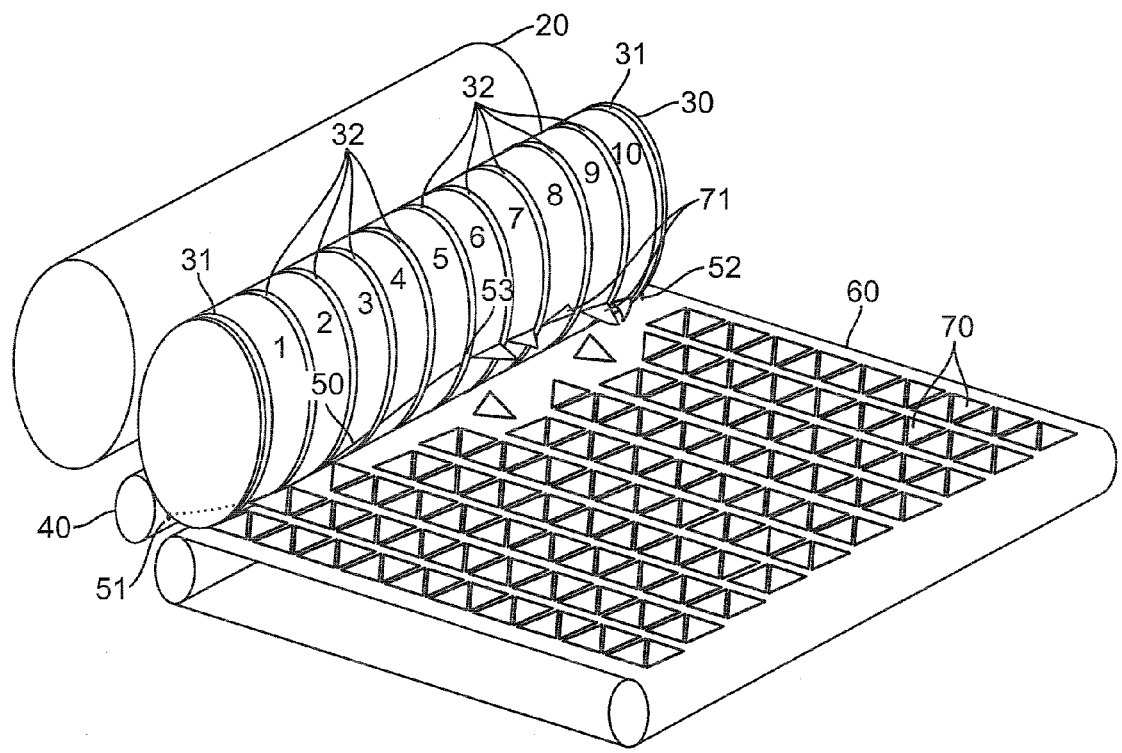
FIG. 4A shows the typical arrangement of the stripper wire stretched across the width of the front rollers in the prior art sheeter of FIG. 1. The wire may have a sheet spiral (as shown), but frictional forces tend to drag a center regions 53 of the wire upward relative to both ends.
Figure 4B:
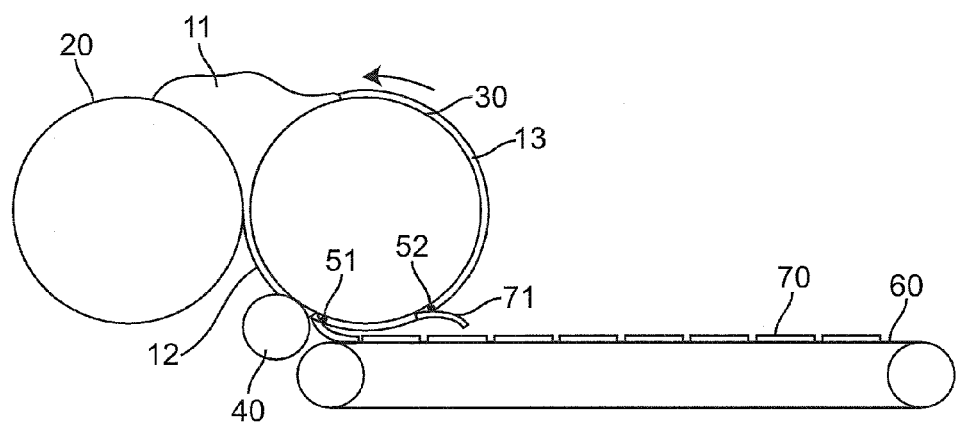
FIG. 4B is an end view of the prior art sheeter of FIG. 4A.
Figure 4C:
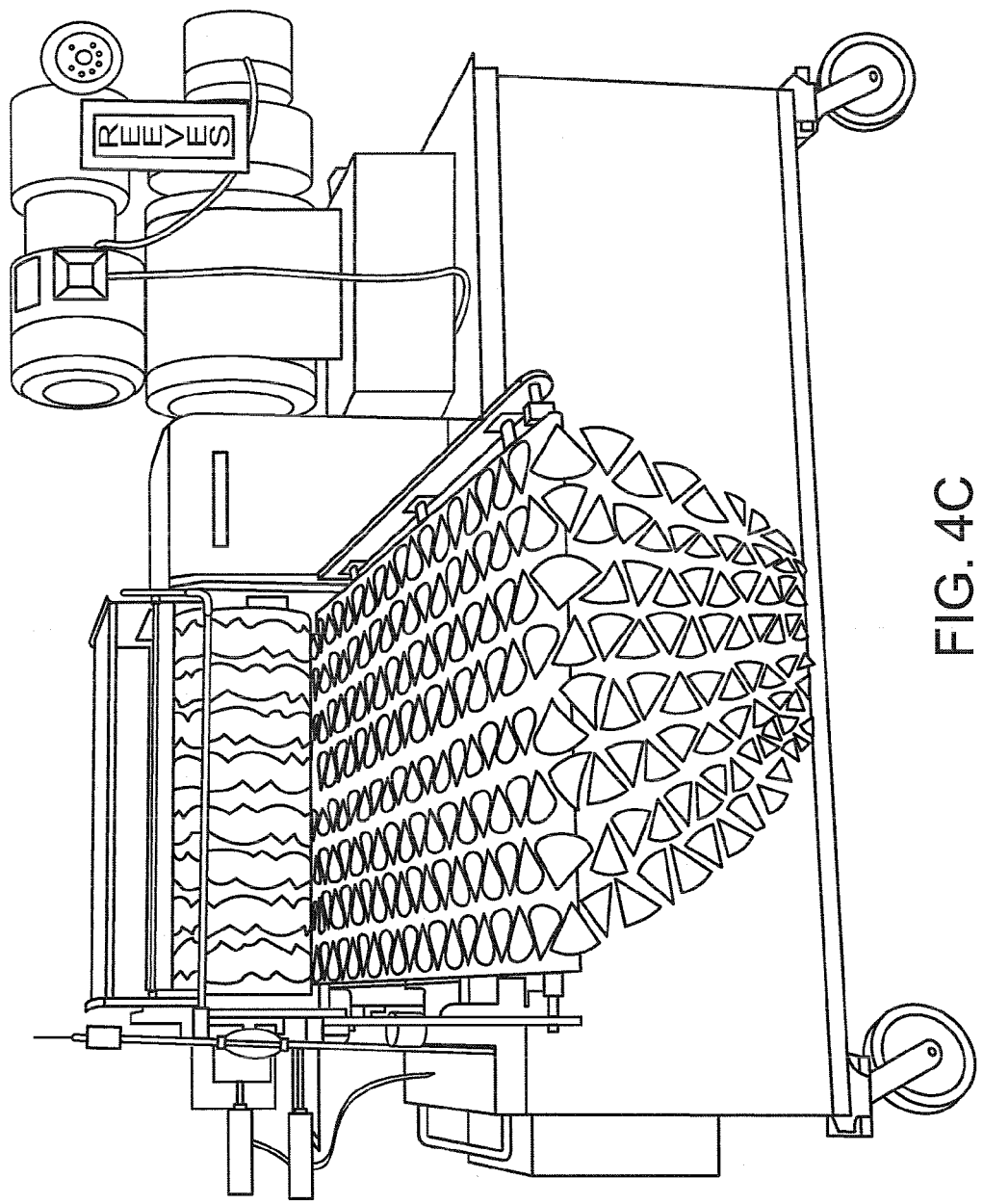
FIG. 4C is an illustration of a prior art sheeter showing multiples rows of product and re-work adhered to the front roller via intermediate band grooves.
Figure 4D:
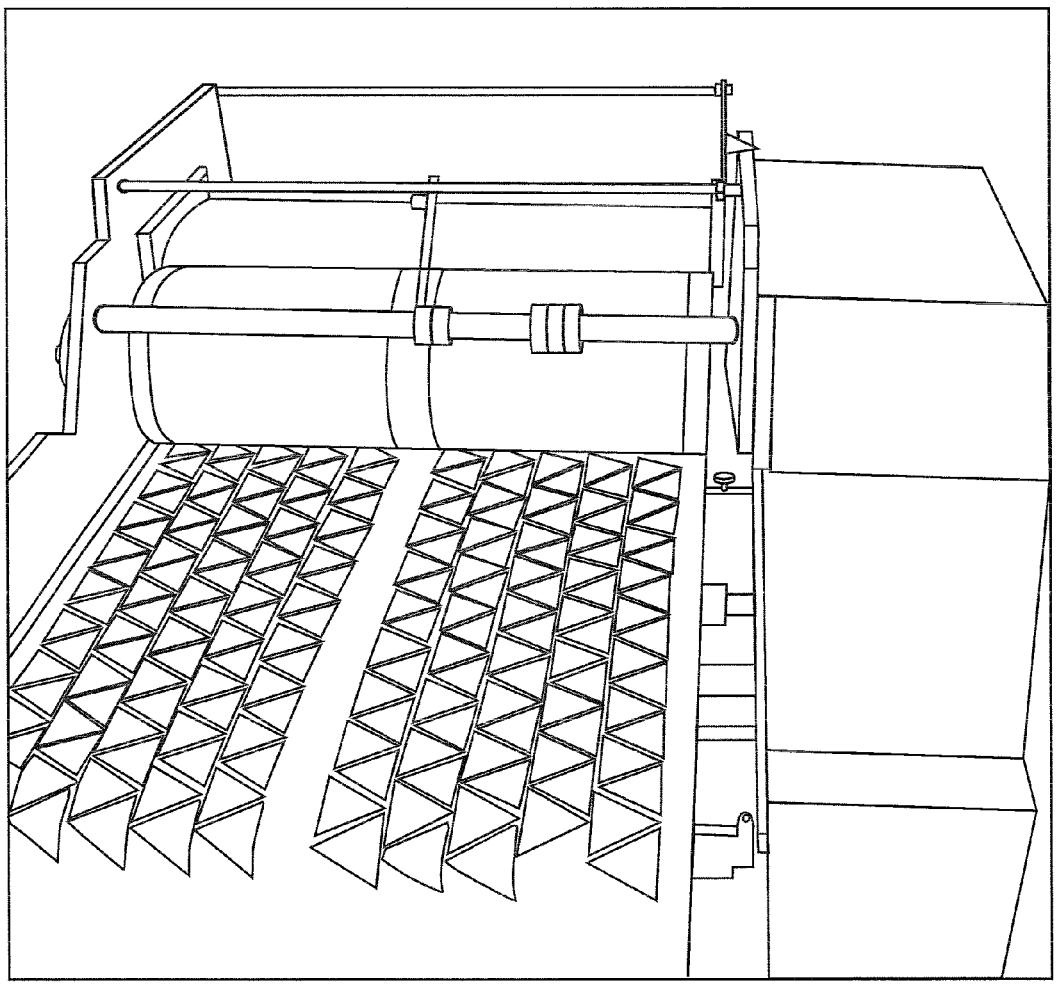
FIG. 4D is an illustration of a prior art sheeter showing multiples rows of product formed by a dual front roller having end and central band grooves.
Figure 9:
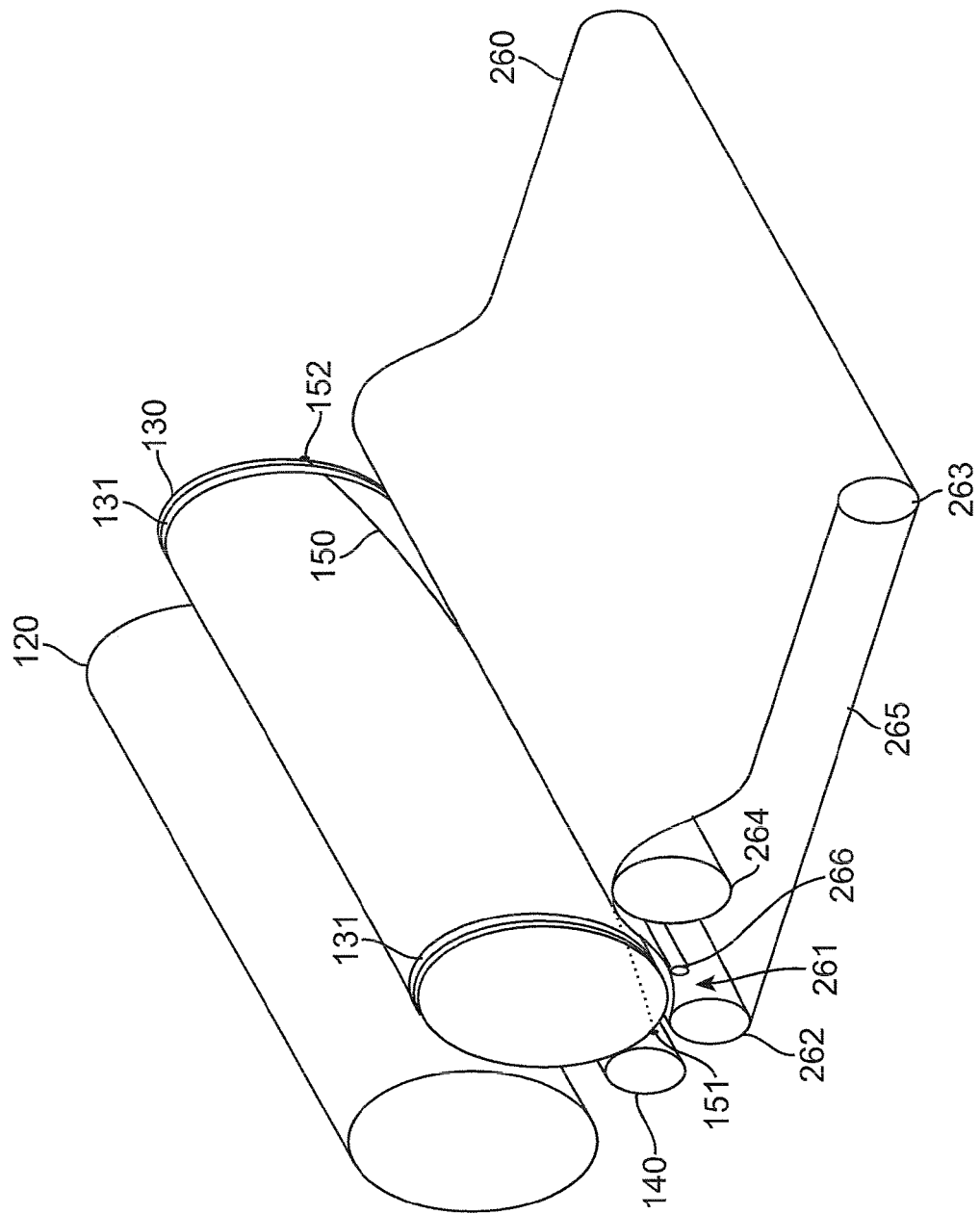
FIG. 9 is a perspective view of the embodiment of the invention illustrated in FIG. 8.

FIG. 9 is a perspective view of the first preferred embodiment of FIG. 8. As shown, the front roller beneficially requires no interior band grooves 132 (like those shown in FIG. 4A). As a result, the cutter roller 140 can be provided with a full pattern of shaped dough pieces. In this embodiment, for example, the sheeter could produce twelve (12) rows of triangular corn chips rather than only ten (10). This is a twenty percent (20%) increase in hourly output and a reduction in the amount of re-work which enhances overall product quality.

Figure 9A:
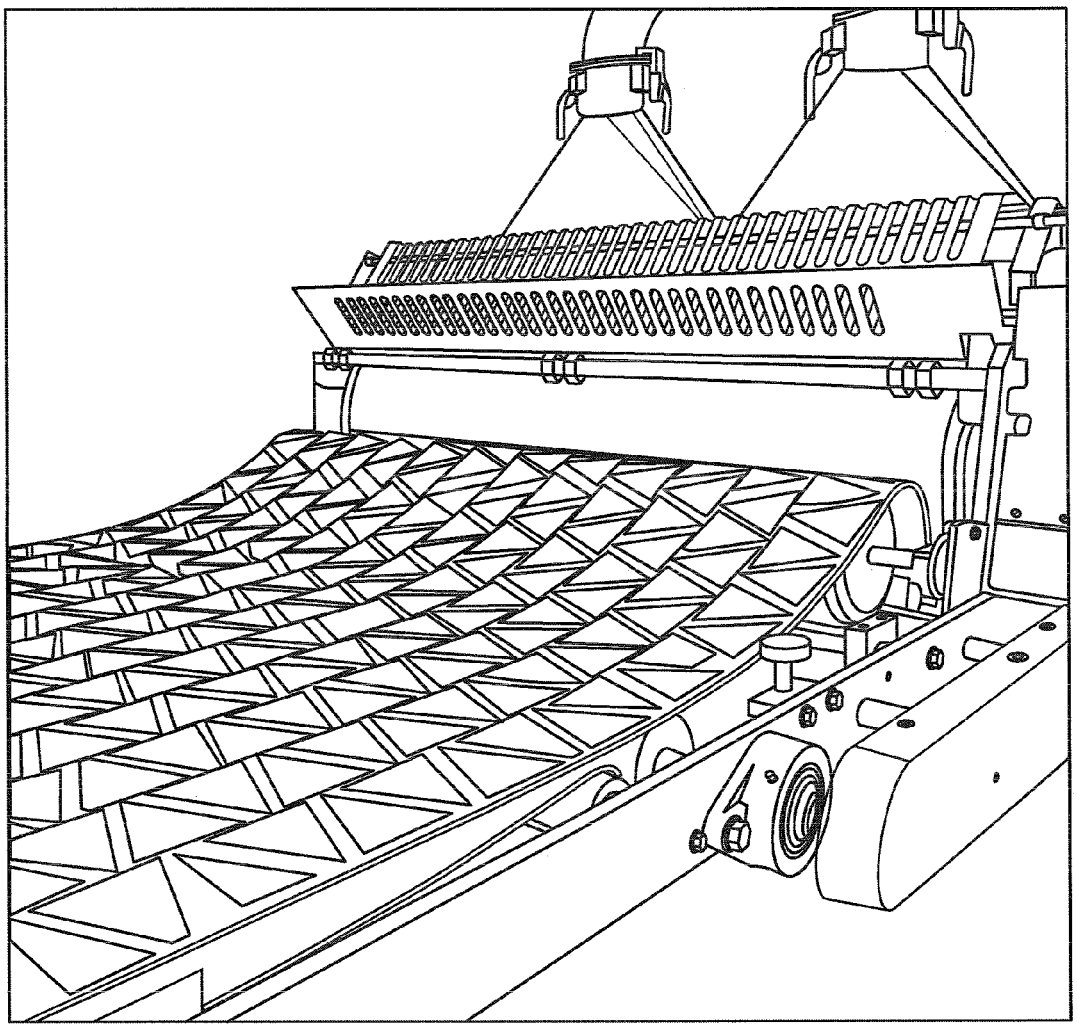
FIGS. 9A to 9C are views of a sheeter corresponding to the embodiment of the invention illustrated in FIG. 9.
Figure 9B:
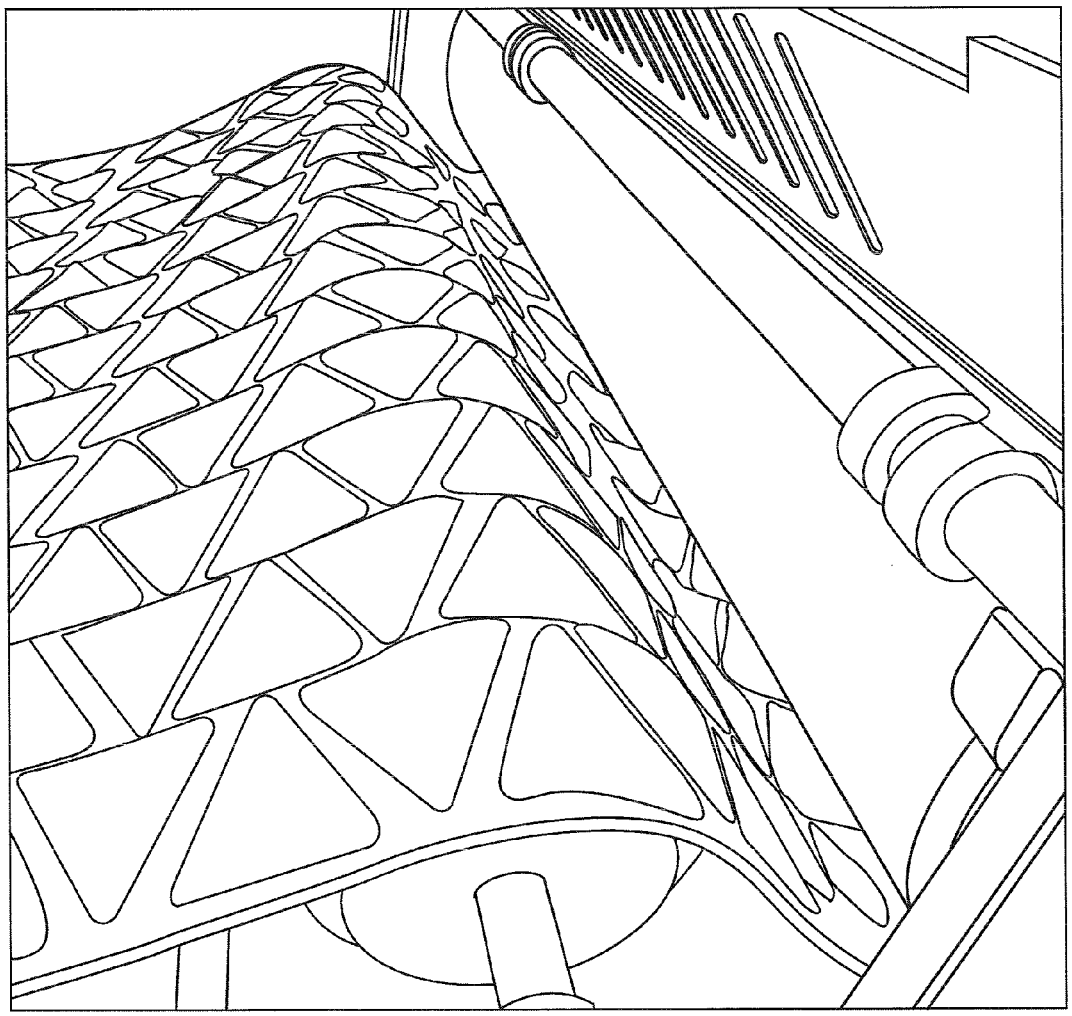
Figure 9C:
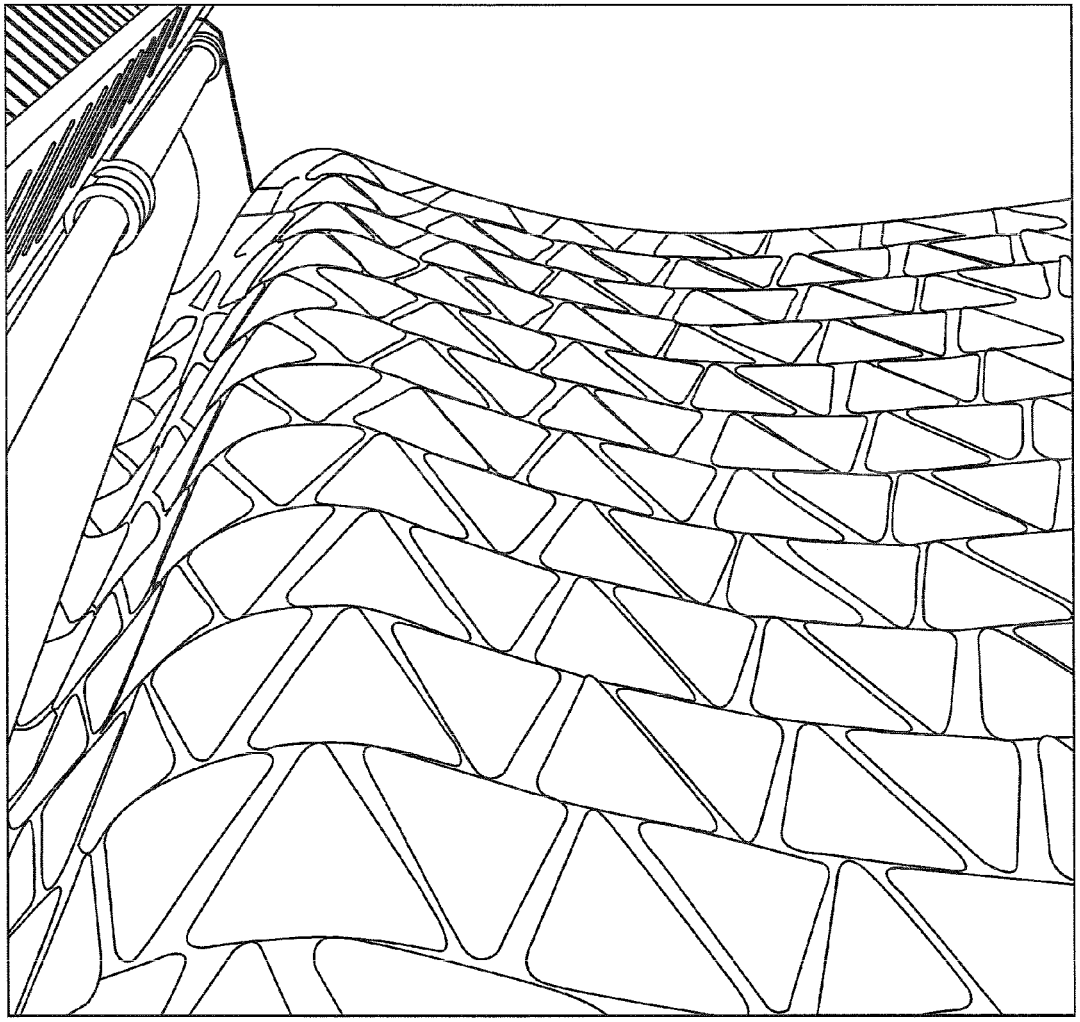

FIGS. 9A to 9C are additional views of an actual sheeter corresponding to the preferred embodiment of FIG. 9. As shown, the front roller does not contain any interior band grooves and the product coverage is highly efficient.

Figure 10:
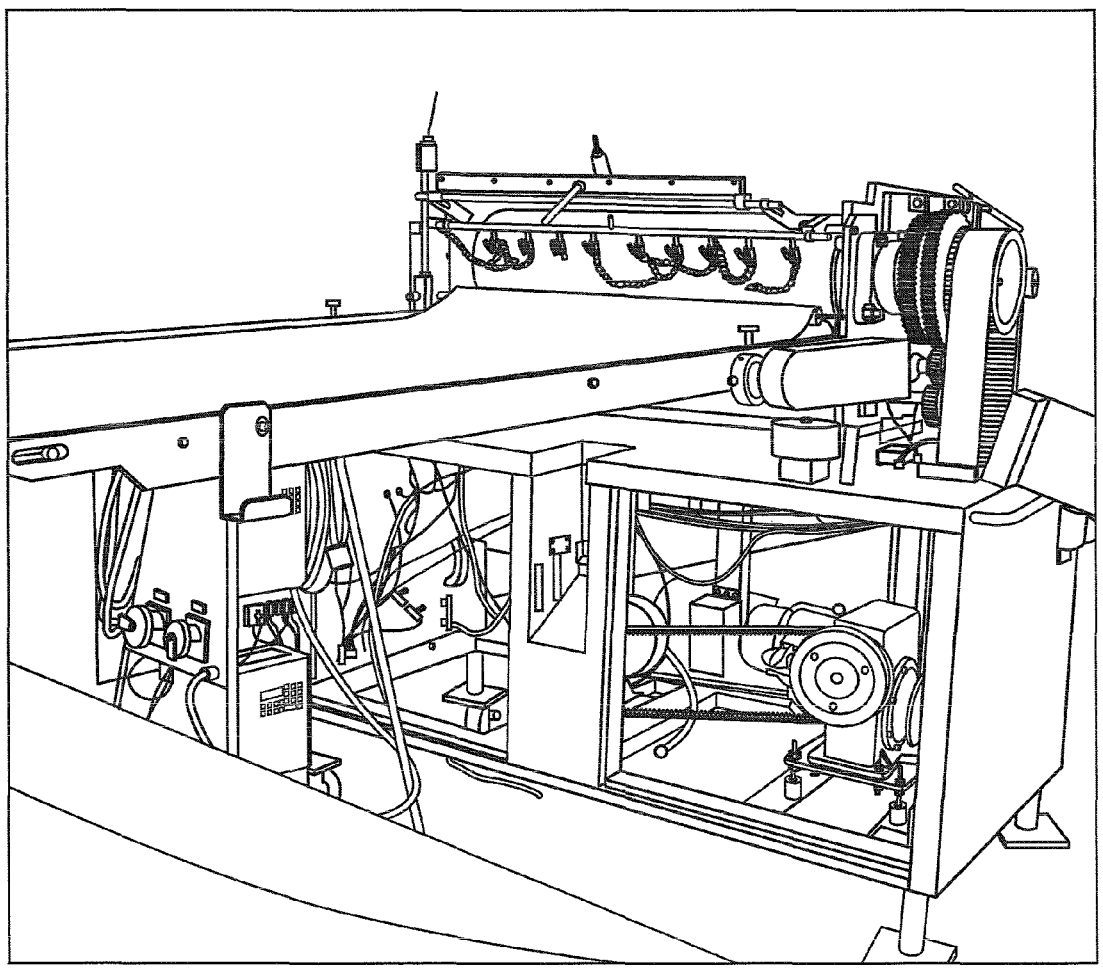
FIGS. 10-12 are views of another embodiment of the invention as an alternative to the embodiment illustrated in FIGS. 9 and 9A to 9C.
Figure 11:
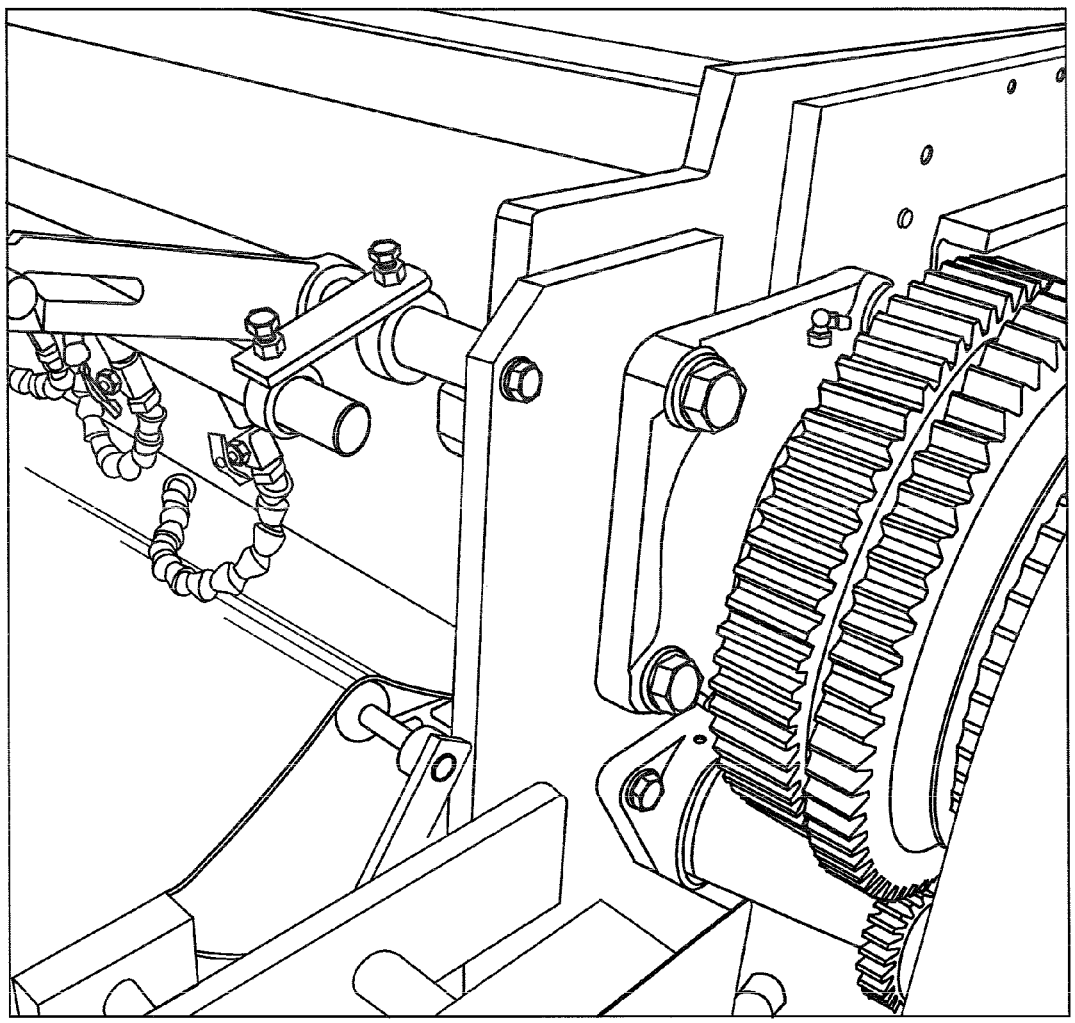
Figure 12:
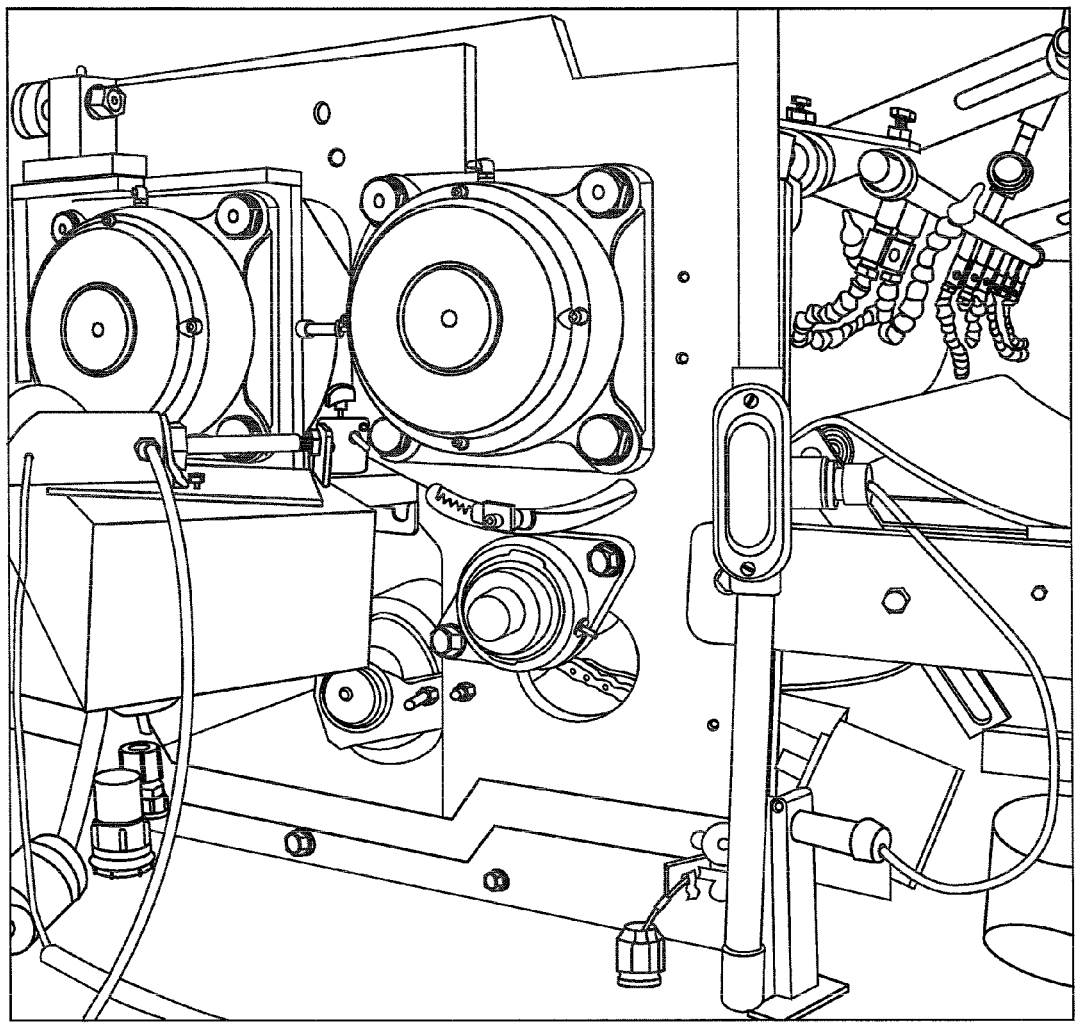

FIGS. 10 to 12 illustrate another embodiment of the invention that varies a bit from, but is quite similar to the presently preferred embodiment of the invention illustrated in FIG. 8. The main differences are twofold. As further illustrated in FIG. 13, the apex roller 264 is larger diameter of about 6 inches rather than about 1 inch. It was discovered through experimentation that a larger diameter apex roller 264 is preferred because a smaller roller tended to accelerate the dough pieces off of its radius, resulting in occasional product defects.

Figure 13:
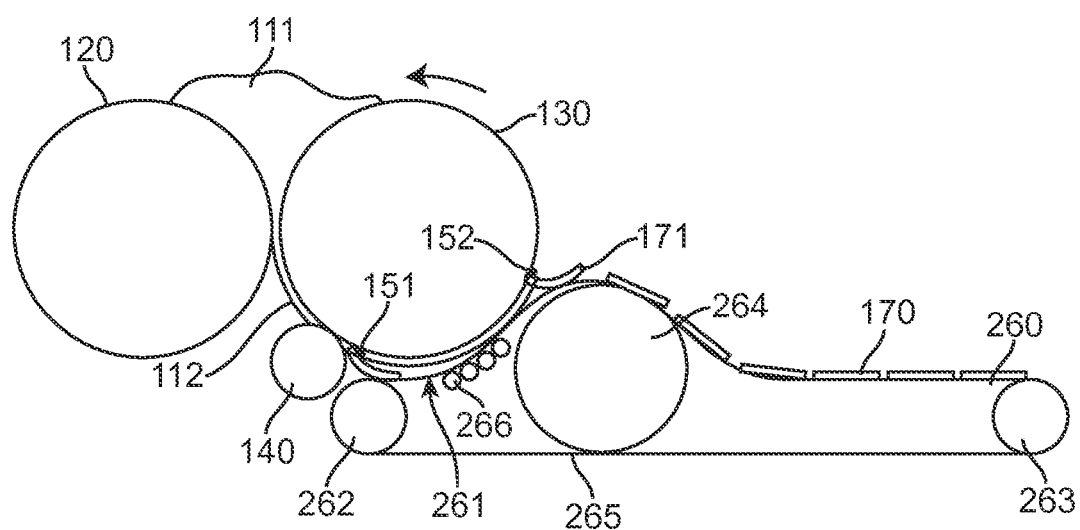
FIG. 13 illustrates a side view of another sheeter including larger rollers and multiple landing zone magnetic rollers according to another embodiment of the invention.
Figure 14:
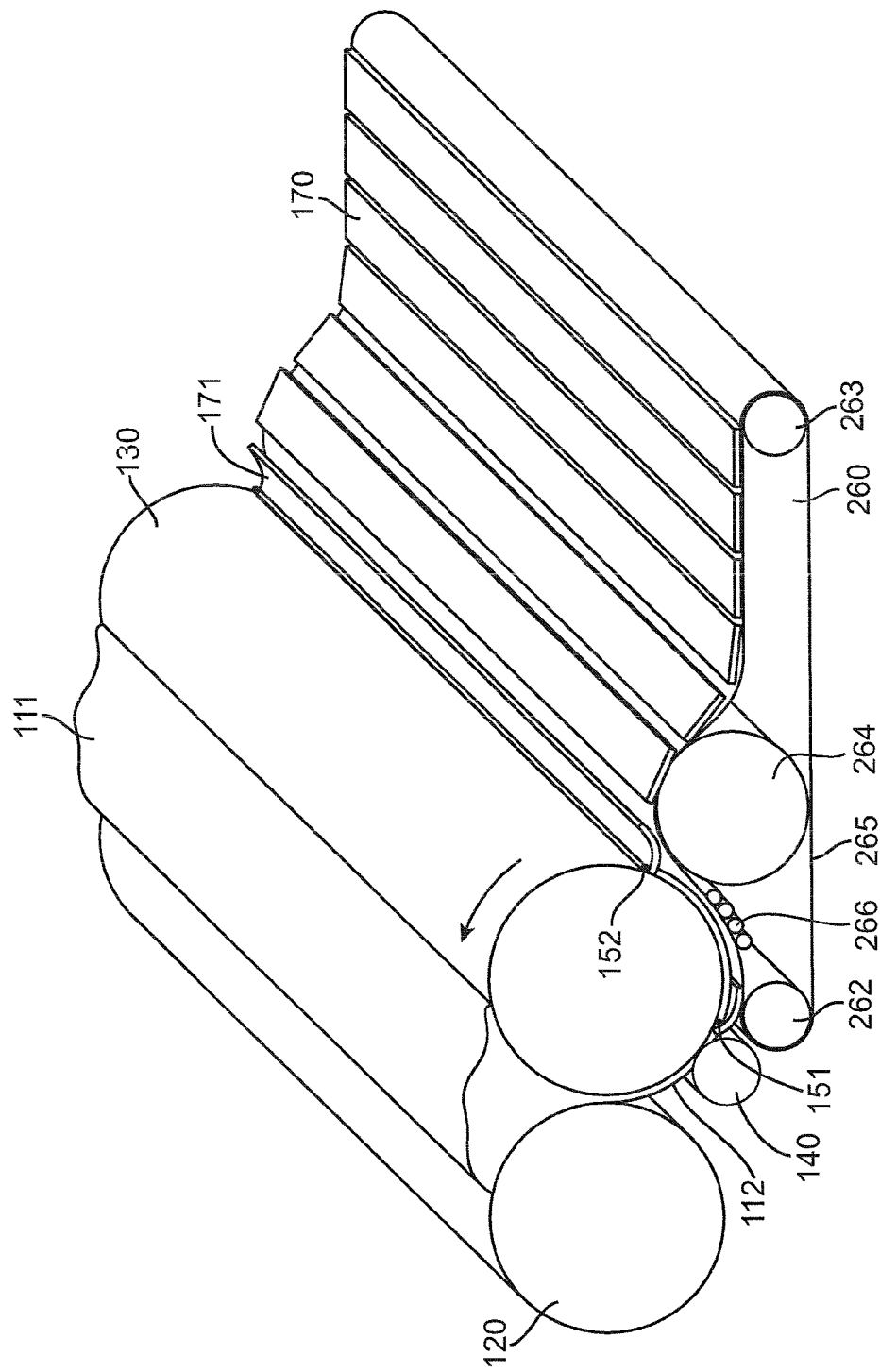
FIG. 14 illustrates a perspective view of the sheeter illustrated in FIG. 13.

As illustrated in FIG. 13, one embodiment includes a plurality of magnetic rollers 266, such as 2, 3, 4, etc. In this embodiment of the invention, due to the larger apex roller, the additional magnetic rollers 266 are necessary for higher speeds of the mesh belt 265. FIG. 14 illustrates a perspective view of the embodiment shown in FIG. 13.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A sheeter apparatus, comprising:
an internally grooveless front roller;
a rear roller configured to rotate counter to the front roller;
a partially spiraled stripper wire coupled across the front roller; and
a conveyer belt coupled to a proximal conveyer roller and a distal conveyer roller,
wherein the conveyer belt includes a landing zone configured to prevent damage to a received product, and the conveyer belt includes a raised portion adjacent to the proximal end and flat portion towards the distal end.

2. The sheeter apparatus of claim 1, further comprising an elevation element configured to elevate the raised portion of the conveyer belt.

3. The sheeter apparatus of claim 2, wherein the elevation element is a rotatable roller.

4. The sheeter apparatus of claim 2, wherein the elevation element is a non-rotating plate.

5. The sheeter apparatus of claim 2, wherein the conveyer belt includes a metal portion.

6. The sheeter apparatus of claim 5, further comprising one or more magnetic rollers configured to attract the conveyer belt.

7. The sheeter apparatus of claim 6, wherein the one or more magnetic rollers are disposed between the proximal roller and the elevational element.

8. The sheeter apparatus of claim 2, wherein the conveyer belt includes one or more guide tabs.

9. The sheeter apparatus of claim 1, wherein the product comprises a plurality of individual pieces that land on the landing zone from a first edge of the conveyer belt to a second edge of the conveyer belt in a side to side fashion without a substantial gap between adjacent product pieces.

10. The sheeter apparatus of claim 1, wherein the front roller is impregnated with a release agent.

11. The sheeter apparatus of claim 1, wherein the stripper wire is coupled at one end to a first anchoring element and at a second end to a second anchoring element, wherein the stripper wire is held taught against the front roller based on the first anchoring element and the second anchoring element.

12. A sheeter apparatus, comprising:
an internally grooveless front roller;
a stripper wire coupled across the front roller;
a conveyer belt coupled to a proximal conveyer roller and a distal conveyer roller; and
an elevation device disposed between the proximal conveyer roller and the distal conveyer roller,
wherein the conveyer belt includes a raised portion adjacent to the elevation device, and the conveyer belt includes a landing zone configured to prevent damage to a received product.

13. The sheeter apparatus of claim 12, wherein the elevation element is configured to elevate the raised portion of the conveyer belt.

14. The sheeter apparatus of claim 12, wherein the elevation element is a rotatable roller.

15. The sheeter apparatus of claim 12, wherein the elevation element is a non-rotating plate.

16. The sheeter apparatus of claim 12, wherein the conveyer belt includes a metal mesh portion.

17. The sheeter apparatus of claim 16, further comprising one or more magnetic rollers configured to attract the metal mesh portion.

18. The sheeter apparatus of claim 16, wherein the one or more magnetic rollers are disposed between the proximal roller and the elevational element.

19. The sheeter apparatus of claim 12, wherein the conveyer belt includes one or more guide tabs.

20. The sheeter apparatus of claim 12, wherein the front roller is impregnated with a release agent.

21. The sheeter apparatus of claim 12, wherein the stripper wire is coupled at one end to a first anchoring element and at a second end to a second anchoring element, wherein the stripper wire is partially spiraled and held taught against the front roller based on the first anchoring element and the second anchoring element.

\* \* \* \* \*